United States Patent [19]

DeMichael

[11] Patent Number: 5,154,835
[45] Date of Patent: Oct. 13, 1992

[54] COLLECTION AND SEPARATION OF LIQUIDS OF DIFFERENT DENSITIES UTILIZING FLUID PRESSURE LEVEL CONTROL

[75] Inventor: John DeMichael, Springfield, Pa.
[73] Assignee: Environmental Systems & Services, Inc., Clearwater, Fla.
[21] Appl. No.: 804,453
[22] Filed: Dec. 10, 1991
[51] Int. Cl.$^5$ .............................................. E02B 15/04
[52] U.S. Cl. ...................................... 210/744; 210/776; 210/800; 210/104; 210/242.3; 210/258; 210/540; 210/923
[58] Field of Search ................ 210/242.3, 776, 923, 210/533, 539, 744, 104, 122, 255, 256, 258, 259, 262, 540, 800

[56] References Cited

U.S. PATENT DOCUMENTS

| | | | |
|---|---|---|---|
| 2,876,903 | 3/1959 | Lee | 210/242.3 |
| 3,508,652 | 4/1970 | Woolley | 210/242.3 |
| 3,529,720 | 9/1970 | Chablinx | 210/923 |
| 3,532,219 | 10/1970 | Valdespiso | 210/242.3 |
| 3,578,171 | 5/1971 | Usher | 210/242.3 |
| 3,617,017 | 10/1971 | Valdespiso | 210/242.3 |
| 3,642,140 | 2/1972 | Parker | 210/242.3 |
| 3,690,464 | 9/1972 | Heinicke | 210/242.3 |
| 3,722,688 | 3/1973 | Wirsching | 210/242.3 |
| 3,722,689 | 3/1973 | Markel et al. | 210/242.3 |
| 3,727,765 | 4/1973 | Henning, Jr. et al. | 210/242.3 |
| 3,741,391 | 6/1973 | Donsbach | 210/123 |
| 3,752,317 | 8/1973 | Lithen | 210/242.3 |
| 3,754,653 | 8/1973 | Verdin | 210/197 |
| 3,815,751 | 6/1974 | Pavlovic | 210/242.3 |
| 3,822,789 | 7/1974 | Crisafulli | 210/242.3 |
| 3,830,370 | 8/1974 | Glaser et al. | 210/242.3 |
| 3,850,807 | 11/1974 | Jones | 210/170 |
| 3,860,519 | 1/1975 | Weatherford | 210/242.3 |
| 3,862,040 | 1/1975 | Preus et al. | 210/253 |
| 3,915,864 | 10/1975 | Massei | 210/242.3 |
| 3,966,613 | 6/1976 | Kirk et al. | 210/242.3 |
| 4,108,773 | 8/1978 | Macaluso | 210/242.3 |
| 4,120,793 | 10/1978 | Strain | 210/175 |
| 4,132,645 | 1/1979 | Bottomley et al. | 210/540 |
| 4,146,482 | 3/1979 | Shyu | 210/242.3 |
| 4,203,842 | 5/1980 | Di Perna | 210/242.3 |
| 4,243,529 | 1/1981 | Strauss | 210/109 |
| 4,531,860 | 7/1985 | Barnett | 405/60 |
| 4,546,830 | 10/1985 | McLaughlin et al. | 166/730 |
| 4,795,567 | 1/1989 | Simpson et al. | 210/744 |
| 4,818,399 | 4/1989 | Midkiff | 210/242.3 |
| 4,865,725 | 9/1989 | Metais | 210/136 |
| 4,985,696 | 1/1991 | Beomont | 340/618 |

Primary Examiner—Stanley S. Silverman
Assistant Examiner—Christopher Upton
Attorney, Agent, or Firm—Nixon & Vanderhye

[57] ABSTRACT

Apparatus and associated methods of operation for the collection, separation and recovery of a contaminant from a body of water are provided which include as an essential element a collection tank which receives ingested liquids such as oil and water from one or more intake devices. The level of oil/water within the tank is controlled by means of pressurized gas, preferably air, which is selectively introduced into the tank, above the oil/water collection therein. The compressed air may also be utilized to remove the collected oil and to transmit the oil to storage.

40 Claims, 6 Drawing Sheets

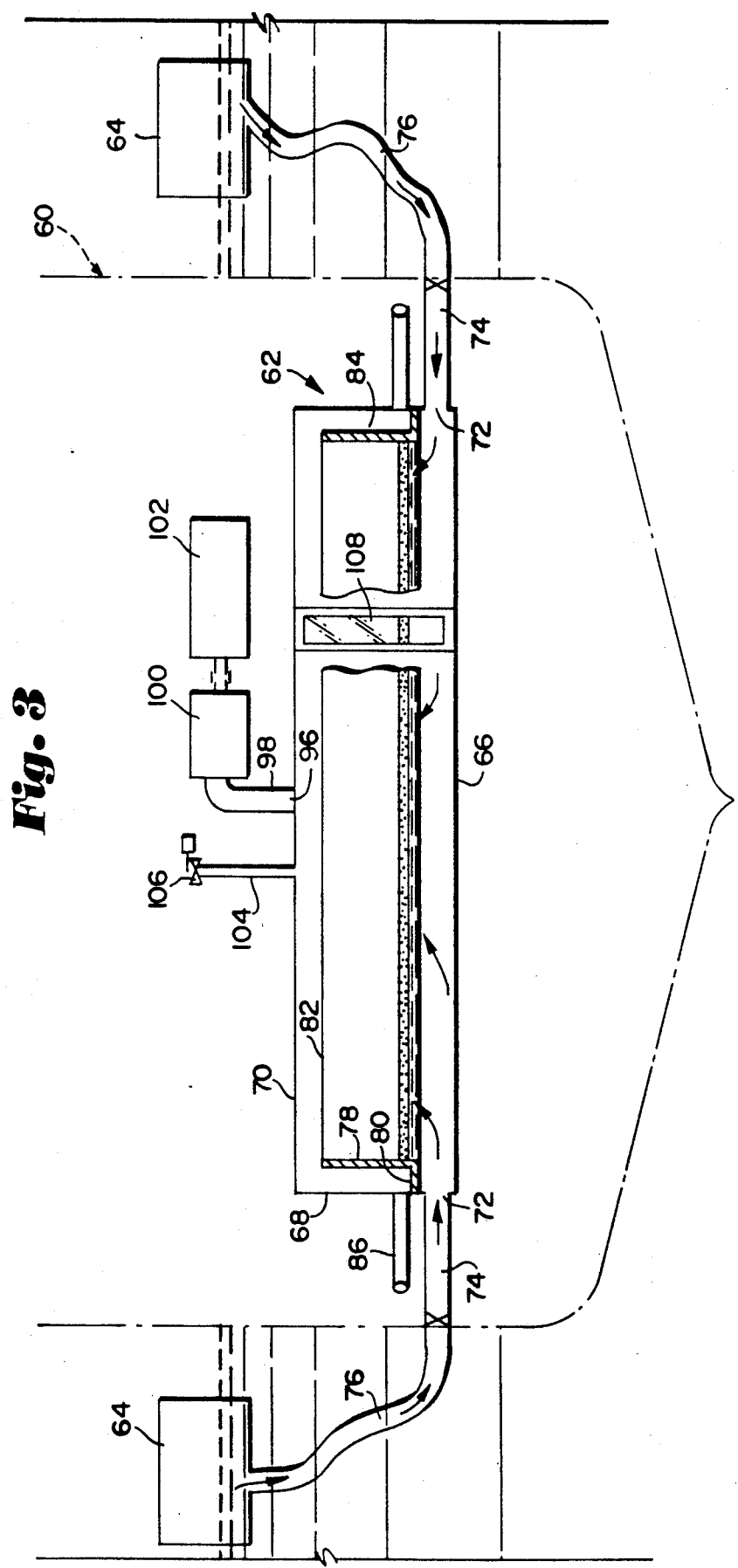

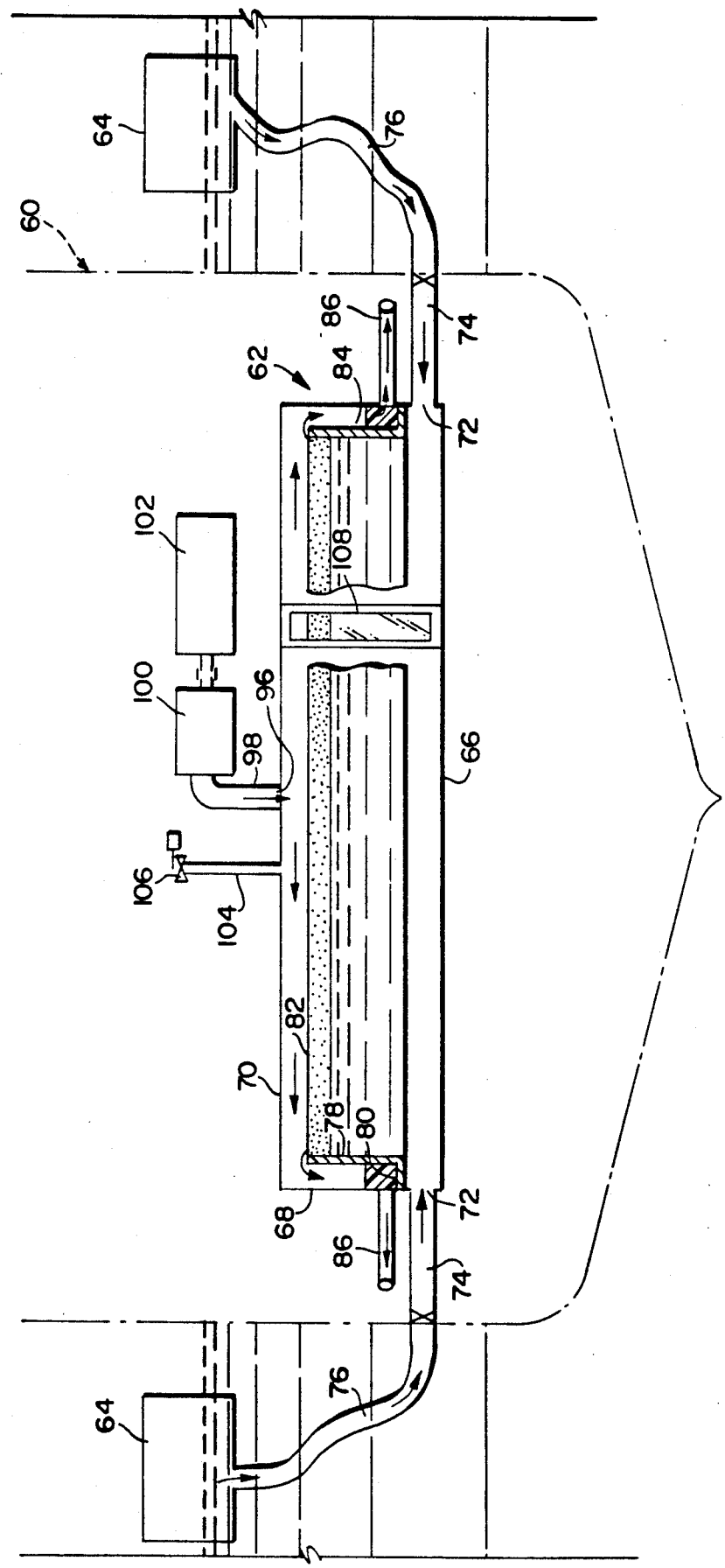

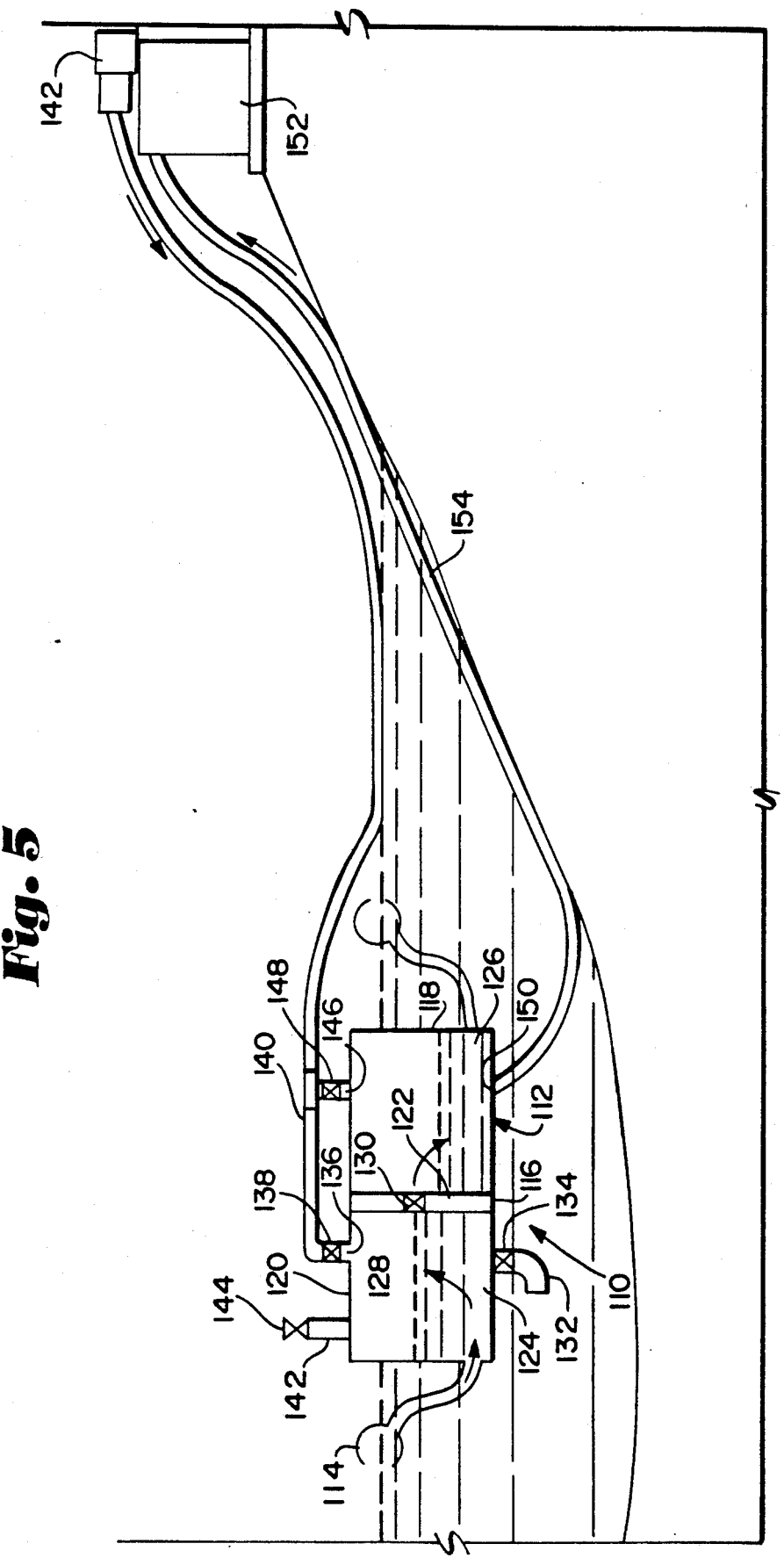

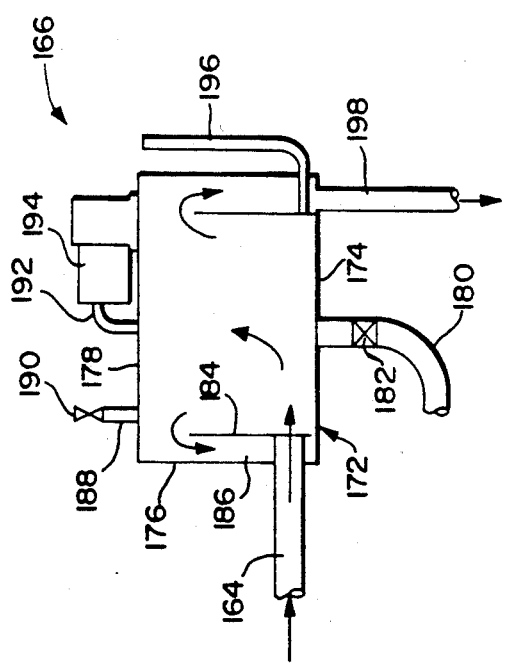
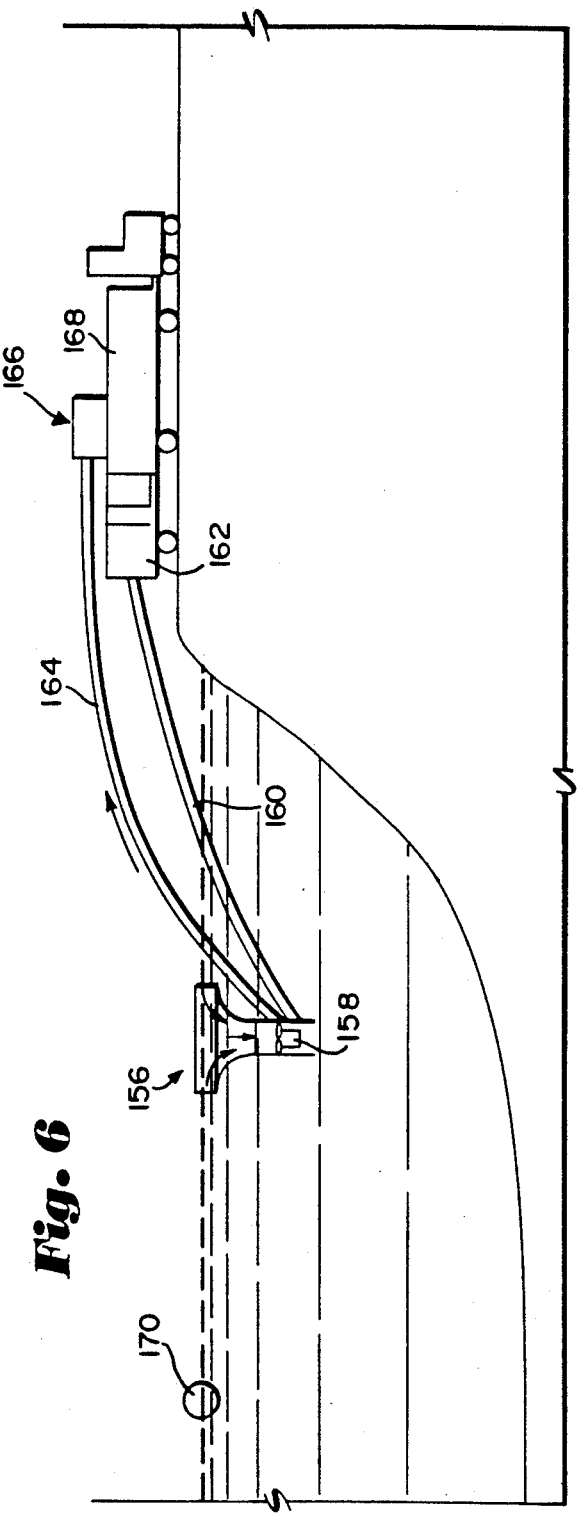

COLLECTION AND SEPARATION OF LIQUIDS OF DIFFERENT DENSITIES UTILIZING FLUID PRESSURE LEVEL CONTROL

RELATED APPLICATIONS

This application is related generally to commonly owned co-pending application Ser. No. 07/804452 entitled "System For The Collection And Separation Of Liquids Of Different Densities" filed Dec. 10, 1991, the entirety of which is incorporated herein by reference.

BACKGROUND AND SUMMARY OF THE INVENTION

This invention relates generally to methods and apparatus for the collection and separation of liquids of different density (typically one of which is considered to be an undesirable contaminant of the other) and for the recovery of the less dense liquid. More specifically, the present invention has particular applicability to (but is not limited to) the clean-up of oil or other chemical spills from surface waters of bays, inlets, harbors, lakes, rivers, shorelines and offshore ocean ways.

There are numerous examples of contaminant spill clean-up apparatus and related techniques described in the patent literature. Representative patents include the following: U.S. Pat. Nos. 4,818,399; 4,203,842; 4,146,482; 3,862,040; 3,860,519; 3,815,751; 3,752,317; 3,741,391; 3,690,464; 3,642,140; 3,578,171; and 2,876,903.

The present invention seeks to improve over prior known apparatus and/or techniques as will be apparent from the description which follows.

The invention has for its principal object the provision of apparatus and associated methodology for clean-up of chemical or other contaminant spills of virtually any size in any type of waterway, and for substantially preventing and/or minimizing intrusion of waterborne contaminants onto shorelines, beaches or other land areas or inlets to water treatment plants or the like. To this end, apparatus is provided with intake characteristics capable of creating an "inflow" of liquids (oil/water in the principal example) at such high rates as to prevent and/or reduce the spill or dispersion of the spill while operating on an aqueous surface. The apparatus is also designed to recover the spilled contaminant. Thus, the apparatus is configured for collection and separation of, by way of example, oil and water, recovery of the oil, and discharge of the separated water back into the waterway.

The apparatus of this invention generally includes a system of one or more inlet openings sized and positioned to allow surface fluid liquids (water and surface oil) to flow into a corresponding number of free floating intake devices or catch basins, each connected by one or more flexible conduits to a main collection tank. In one arrangement, the intake is in the form of a continuous torus, with a radially outwardly facing, 360° inlet opening. In another arrangement, the intake is in the form of a discontinuous torus, i.e., a plurality of separate arcuate segments arranged in a generally torus shape as described in the above identified co-pending application.

The flexible conduits extending between the intake and the collection tank not only act as gravity drains for carrying the oil/water to the main collection tank, but also serve an important passive function in that they divorce any rigidity between the catch basins and the main collection tank. Thus, it will be appreciated that as the main tank fills and takes on weight, it will sink to an approximate predetermined depth in direct relationship to its weight (which may vary within limits as it reaches an approximate state of equilibrium during continuous operation), but the catch basins will be unaffected due to the slack provided by the flexible conduits. As a result, the catch basins will achieve a consistent water line zero at the surface, independent of the continuously varying level of the main collection tank.

In a first exemplary embodiment, the main collection tank is a free floating structure which incorporates a hydrocarbon pump and associated siphon float device as described in greater detail below. The pump is utilized to transfer separated surface oil collected in the tank to an oil recovery storage facility on board a nearby vessel, or on land if the system is operating near a shoreline. The level of oil/water in the main collection tank is controlled by a pressurized gas, preferably air, introduced into the tank by means of a conduit extending from a source of pressurized air (e.g. a conventional compressor) to an inlet in the top wall of the tank. The compressor, like the oil storage facility, may be located on a nearby vessel or on land, depending on the deployment location of the system.

The top wall of the tank is also provided with a valve-controlled vent or standpipe which is open when the compressor is shut down, and closed when the compressor is activated. By selective actuation of the compressor and standpipe valve by means of level sensors within the tank, the oil/water level, the oil to water ratio and the thickness of the oil in the tank can be controlled as described further herein.

The main collection tank is preferably also provided with a water discharge or drain in the bottom wall of the tank to provide a further measure of level control, and to permit periodic purging of the tank.

The tank as described is further provided with a flotation collar, preferably urethane filled, for insuring flotation of the tank.

In addition to the enhanced ability to control the oil/water level in the tank, a further advantage of the above described system is that the pressurized air tends to flatten the oil/water surface in the tank, thereby quieting the surface action and further enhancing the oil recovery aspect of the system.

The above described apparatus may be operated as follows. With the standpipe open and the compressor shut down, oil/water enters the intake device or catch basin and flows downward into the main collection tank. Ingestion of oil/water will occur at an inflow rate and oil/water ratio dependent on intake system selection and on the maximum feed pressure (based upon a $\Delta P$ determined by the vertical distance between the intake device and the level of liquid inside the separation tank).

When the level of oil/water reaches a first level sensor, the hydrocarbon pump is activated and begins pumping oil which has risen to the surface within the tank, to storage. The level of oil/water continues to rise and reaches a second level sensor which causes the standpipe valve to close and the compressor to feed pressurized air into the tank (while separated oil continues to be pumped out of the tank). During this time, the level within the tank is maintained below the surface level outside the tank, and the pressurized air reaches an equilibrium with the water head (the pressure difference caused by the level in the tank versus the surface level outside the tank) and thereby causes the inflow of oil/water to cease. A further increase in air pressure will force water out of the intake device, thereby lowering the level inside the tank. In an alternative arrangement, a water drain and associated pump may be located in the bottom of the tank for discharging water from the tank to not only lower the water/oil level in the tank, but also to increase the oil to water ratio in the tank. When the level in the tank drops to a third level sensor, the standpipe valve is opened and the compressor shut down, thereby permitting oil/water to again flow into the intake device and into the tank. The above described procedure is then repeated in an essentially continuous manner until the vessel capacity for oil storage is reached and/or until the spill is substantially removed from the waterway.

In a second exemplary embodiment of the invention, the main collection tank is located within a tanker or other vessel, below the water line, so that oil/water will flow under the influence of gravity from one or more freely floating intake devices as described above. In this regard, a single intake device may be provided which is continuous in form, surrounding the vessel. Other configurations, of course, may also be utilized including one or more intake devices extending along either side of the vessel. The size, shape and number of intake devices or catch basins will be determined by the capacity of the collection tank, as well as the particular type and location of the spill.

Aside from the inboard configuration, this second exemplary embodiment differs from the first described embodiment principally in that no hydrocarbon pump is required. Rather, a weir dam configuration is employed wherein a cylindrical ring is mounted concentrically within the tank establishing a radially outer chamber between the tank wall and the cylindrical ring. In this embodiment, the oil/water inlets are arranged to feed the oil/water to the inner chamber defined by the cylindrical ring so that when this chamber fills, the oil on the surface of the oil/water will spill over the upper edge of the cylindrical ring, or weir dam, and flow downwardly into the radially outer chamber to one or more headers which transfer the separated oil to storage tanks within the vessel.

As in the first described embodiment, the top wall of the inboard tank is provided with an inlet for compressed air as well as a valve controlled standpipe or vent. A viewing window or panel is also provided to aid the operator within the vessel in controlling the oil/water level within the tank. The bottom wall of the tank may be provided with a water drainage conduit incorporating a pump which further facilitates control of the oil/water level within the tank, and which may also be utilized as an emergency evacuation conduit and/or for purging the tank and intakes.

In operation, the inboard embodiment will ingest oil/water in the same manner as the first described embodiment.

As the oil/water fills to the weir height, the compressor will introduce air under pressure to equal the ΔP pressure thereby maintaining the liquid level at a height desired above the weir for essential continuous flow of surface oil to storage. The air pressure will also modulate the surface way of action for smooth weir surface feed.

Air pressure may also be used to control the height or level of oil/water at the weir dam to increase, decrease or void flow over the weir. As already indicated, an observation panel or window will allow the operator to observe the liquid level as well as the thickness of oil film on the surface of the oil/water and to control the compressor to achieve the desired results. The operator may also periodically increase air pressure above the ΔP head pressure to thereby purge the water and intake fluid until the oil surface thickness has reached a desired dimension. The air pressure can then be reduced to resume collection separation and recovery of the spilled oil.

In another exemplary embodiment of the invention, an arrangement is provided which is particularly adapted for use in the clean-up of spills adjacent a beach or shoreline. In this embodiment, the main tank is divided into a oil/water collection tank and a non-vented overflow tank, with the level in both tanks controlled by compressed air from a source which may be conveniently located on land. In this embodiment, oil/water enters the collection tank by means of an intake device of the type described above, and the level within the tank rises to the level of an overflow valve in an interior partition dividing the main tank. When the oil in the overflow tank reaches a predetermined level, the overflow valve along with the vent or standpipe valve and the air inlet valve in the collection, are closed, and air inlet valve in the overflow tank opened. Air under pressure is introduced into the overflow tank forcing the oil therein to a storage tank on land by means of any suitable conduit arrangement. As the oil level drops within the overflow tank, a switch shuts down the compressor and the valve actuation reversed to resume collection and separation as described above.

In another related embodiment, the separation tank itself may be located on land, with the intake device being the only waterborne components of the apparatus. In this arrangement, the intake device itself will incorporate a pump for pumping the oil/water to the separation tank. Otherwise, the separation technique is essentially the same as described above, with compressed air controlling the oil/water level within the tank.

In all of the above described embodiments, the utilization of gas under pressure to control levels within collection and/or overflow tanks enables close control over the operation and provides for enhanced collection, separation and recovery in a simple, efficient and low cost manner not previously possible with conventional systems.

Other objects and advantages of the invention will become apparent from the detailed description which follows.

BRIEF DESCRIPTION OF THE DRAWINGS

FIG. 3 is a schematic illustration as shown in FIG. 2 but showing oil/water entering into the tank;

FIG. 4 is a schematic view as illustrated in FIGS. 2 and 3, but illustrating the manner in which the oil spills over a weir dam located within the tank;

FIG. 5 is a schematic representation of apparatus in accordance with a third exemplary embodiment of the invention;

FIG. 6 is a schematic representation of apparatus in accordance with a fourth exemplary embodiment of the invention; and FIG. 6A is a schematic detail of a separation tank utilized in conjunction with the embodiment illustrated in FIG. 6.

DETAILED DESCRIPTION OF THE DRAWINGS

Figure 1:
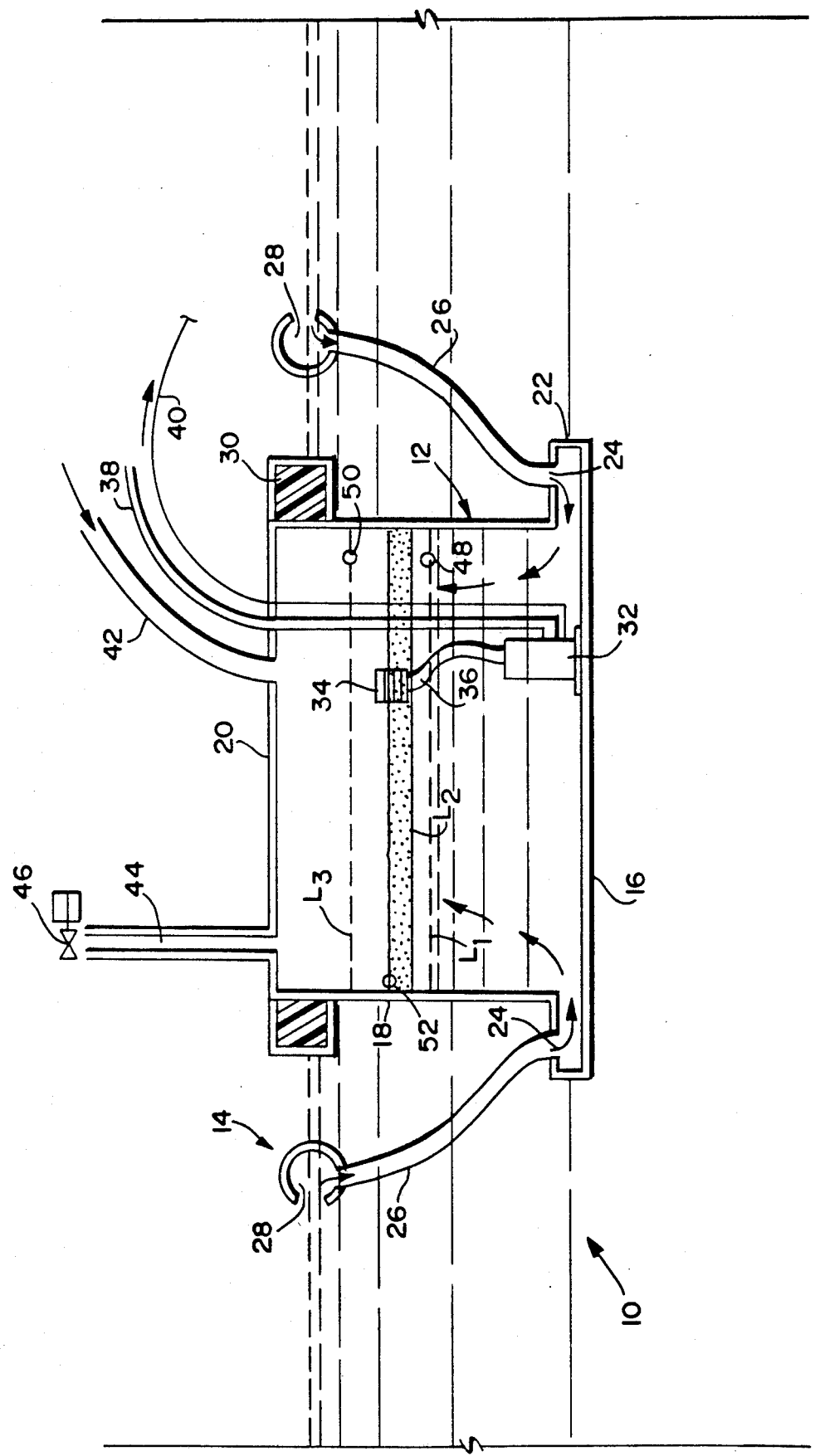
FIG. 1 is a schematic side view of an outboard collection and separation apparatus in accordance with a first exemplary embodiment of the invention.

With reference to FIG. 1, the oil spill collection, separation and recovery system in accordance with a first exemplary embodiment of the invention is shown generally at 10 and includes a free floating or outboard collection and separation tank 12 and a substantially torus shaped intake device or catch basin 14. The tank 12 includes a bottom wall 16, a peripheral side wall 18, and a top wall 20. Adjacent the bottom wall 16, there is formed a substantially hollow radially outwardly extending flange arrangement 22 which provides a convenient location for inlets 24 which receive first ends of a corresponding number of flexible conduits 26 extending between the tank 12 and the intake device or catch basin 14.

As illustrated in FIG. 1, the intake device is in the form of a continuous torus provided with a radially outwardly facing, 360° inlet opening 28 which enables omnidirectional ingestion of oil/water from the surface of the waterway. The intake device 14 may be a continuous torus as shown, or it may be segmented as illustrated in applicant's copending application Ser. No. 07/804452. Other sizes, shapes and numbers of intake devices may be utilized depending on specific applications.

The tank 12 is provided with an exterior flotation collar 30 extending about the upper portion of the side wall 18. The collar is preferably filled with a urethane material (other suitable material may also be employed) which insures flotation of the tank.

A hydrocarbon pump 32 is fixed to the bottom wall 16 of the tank and operates in conjunction with a siphon float device 34 connected to the pump 32 by means of a flexible conduit 36. As will be described in greater detail, the pump serves to transfer oil which has risen to the surface of the oil/water within the tank 12 to an oil recovery storage facility on board a nearby vessel or on land (if the system is in use close to the shoreline). The pump is also connected by means of a line 40 to a power source (not shown).

The top wall 20 is provided with an opening or inlet for receiving a conduit 42 which is employed for the introduction of a pressurized gas, preferably air into the tank as will be described in greater detail below. In addition, the top wall 20 is provided with an air vent or standpipe 44 incorporating a control valve 46.

In use, the intake device or catch basin 14 ingests surface borne oil along with water which flow downwardly under the influence of gravity through the flexible conduits 26 and inlets 24 into the tank 12.

During the ingestion of the oil/water into the tank 12, the valve 46 is open and the compressor shut down so that the level of oil/water will rise within the tank 12. When the oil/water reaches level $L_1$, a sensor 48 activates the hydrocarbon pump 32 to commence pumping the collected oil to storage, but at a lower rate than the rate of intake via catch basin 14. As the oil/water reaches level $L_2$, sensor 50 causes the valve 46 to close and activates the compressor to feed pressurized air into the space between the top wall 20 of the tank and the oil/water level to thereby maintain the level in the vessel below the surface water level outside the tank. During this time, pump 32 continues to evacuate captured oil. It will be understood that the intake 14 will cease to ingest oil/water when the pressurized portion of the vessel 12 reaches an equilibrium with the water head as determined by the vertical distance between the waterway surface and the level within the tank.

On the other hand, a continued increase in pressure within the tank 12 will cause water to be discharged from the bottom of the tank via the conduits 26 and intake device 14 by a reverse flow.

It will be appreciated that a discharge conduit or drain (with or without an associated pump) may be used to discharge water from the bottom of the tank if desired, in a manner which does not require reverse flow through the intake device or catch basin 14.

As the level within the tank 12 drops by reason of the continuous pumping of oil, and lessening or stoppage of oil/water ingestion, the level will drop to a third sensor 52 which deactivates the compressor and opens the standpipe valve 46 so that ingestion of oil/water via the catch basin 14 resumes. Prior to the shutting down of the compressor, it will be appreciated that the intake 14 generally begins taking in oil/water as the level begins to drop from the second level sensor 50 since the air chamber volume grows and, as the level drops, the air chamber pressure decreases to less than the water head.

The above described process is repeated in an essentially continuous manner until the oil storage capacity is reached or until the spill is substantially fully ingested.

In the above described embodiment, an operator on board a nearby tank or vessel can control the level within the tank 12 by means of the above described sensors 48, 50 and 52 as well as conventional pressure regulators associated with the compressor onboard the vessel. By also regulating the operation of the hydrocarbon pump 32, it will be appreciated that the oil/water ratio and the thickness of the oil film on the surface within the tank can also be regulated as desired.

It will also be appreciated that the apparatus (tank and intake) may be periodically cleaned or purged by closing valve 46 and activating the compressor to increase air pressure in the tank 12 to the extent that all oil/water is forced out of the tank by means of reverse flow through the intake 14, and/or with the aid of a water discharge drain/pump in the bottom of the tank.

Figure 2:
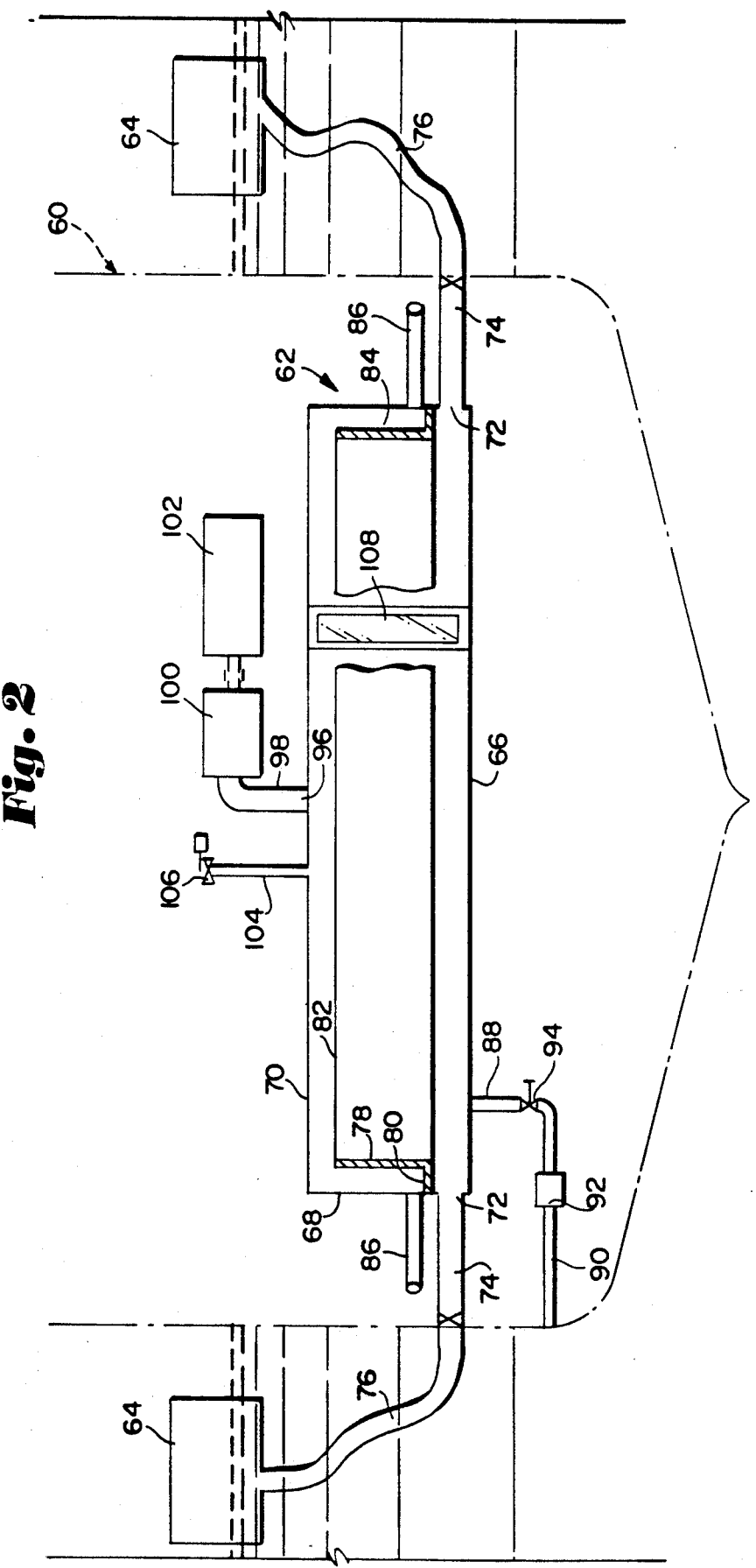
FIG. 2 is a schematic side view of an inboard collection and separation apparatus in accordance with a second exemplary embodiment of the invention, wherein the collection and separation tank is located inboard of a vessel.

Referring now to FIG. 2, a second exemplary embodiment of the oil spill recovery system in accordance with the invention is illustrated wherein a tanker or other oil storage vessel 60 supports the tank 62 within the vessel in an inboard arrangement. As in the first described embodiment, the tank 62 operates in conjunction with at least one intake device 64 which may be continuous, i.e., surrounding the vessel, or in segmented form with multiple intakes located about the vessel. The tank 62 is again constructed with a bottom wall 66, a peripheral side wall 68 and a top wall 70 The lower portion of the side wall 68 is provided with one or more inlet openings 72 which are connected to conduits 74 extending to the side walls of the vessel and which, in turn, are connected to flexible conduits 76 extending between the tanker and the one or more intake devices 64.

Within the tank 62, there is provided a cylindrical ring 78 having a lower radially outwardly extending horizontal flange 80 extending to the side wall 68. The ring 78 creates a weir dam within the tank. Since the horizontal flange 80 is located just above the inlet openings 72, it will be appreciated that the oil/water will flow by gravity from the intake device or devices 64 through the flexible conduits 76 and inlet openings 72 into an interior portion of the tank 62 as defined by the cylindrical ring 78. The ring 78 forms a weir dam having a weir edge 82 which permits the oil floating on the surface of the oil/water within the interior portion of the tank to spill-over into an outer chamber 84 defined between the ring 78 and the side wall 68. The separated oil subsequently flows into one or more headers 86 which transfers the oil to tanks within the vessel 60.

Water discharge from the tank 62 is permitted by means of a drain conduit 88 and discharge conduit 90 along with a water discharge pump 92 located along the conduit 90, in operative association with a valve 94 (these elements shown only in FIG. 2). By suitable control of the valve 94 and pump 92, the level control of oil/water within the center portion of the tank can be controlled, independently or in conjunction with compressed air as described below.

The top wall 70 of the tank is provided with an inlet 96 connected to a conduit 98 adapted to feed air under pressure from a compressor 100 powered by a diesel engine 102 of the vessel 60. The top wall 70 is also provided with a standpipe 104 and associated control valve 106. An operator within the vessel 60 can view the operation of the system by means of a vertically oriented window or panel 108 formed in the side wall 68 of the tank 62. The operation of the apparatus shown in FIG. 2 will now be described in conjunction with FIGS. 3 and 4.

With reference to FIG. 3, upon commencement of the collection, separation and recovery operation, the one or more intakes 64 will ingest the oil/water at an inflow rate and oil/water ratio dependent on the operating characteristics of the intake, as described above in connection with the embodiment illustrated in FIG. 1, with the standpipe valve 106 open and compressor 100 shut down. Turning to FIG. 4, as the oil/water level (with the oil floating to the surface) rises to the weir height as defined by the edge 82, the compressor will be activated to introduce air under pressure into the tank 62 until the air pressure above the level equals the ΔP head pressure, and thereby maintains the level at a height just above the weir edge 82 so that oil on the surface of the oil/water in the interior portion of the tank will spill over the weir dam, more or less continuously, into the outer chamber 84, and to storage by means of headers 86. It will also be appreciated, that the air pressure above the oil/water within the tank 62 will modulate surface wave action within the tank for smooth weir surface feed. The air pressure can also be controlled to adjust the height of the level to increase, decrease or void flow over the weir edge 82.

The observation panel or window 108 allows the operator to view the liquid level and the thickness of the oil film on the surface within the tank to thereby facilitate his ability to operate the apparatus in an optimum manner. For example, the operator may periodically increase the air pressure above the ΔP head pressure (in conjunction with valve 94 and pump 92) to thereby reduce the water in the tank until the oil surface thickness has reached the desired point. He can then vent the tank to permit the level to rise and overflow to storage. It will be appreciated that opening the standpipe 104 by means of valve 106 serves to increase the intake into the tank while closing of the valve is required during pressurization to slow the intake, to hold it at a constant level or to purge the tank.

It will be readily appreciated that utilization of the water discharge pump 92 and valve 94 in concert with the compressor controls the level within the tank, and is also useful for emergency evacuation and/or purge of the tank and intake for cleaning purposes.

It is also contemplated that a diaphragm may be utilized within the tank, and which would be "sandwiched" between the oil/water in the center portion of the tank and the air pressure above the oil/water level. The diaphragm serves to "flatten" the liquid surface within the tank to further eliminate or modulate the surface action.

Turning to FIG. 5, another exemplary embodiment of the invention is illustrated which is particularly useful in operations which are close to the shoreline. In this arrangement, the collection and separation apparatus 110 is supplied as a free floating structure which includes a main tank 112 and an associated intake device 114 which may be of the kind described hereinabove with respect to the embodiment illustrated in FIG. 1. The tank 112 includes a bottom wall 116, a side wall 118 and a top wall 120. In addition, an interior partition 122 divides the tank 112 into a collection compartment 124 and an overflow compartment 126. A flow valve 128 is located in an aperture or opening 130 formed within the partition 122 to control the overflow of surface oil from the collection compartment 124 into the overflow compartment 126 as described below.

The collection compartment 124 is provided with a water discharge outlet 132 and associated valve 134, while the top wall 120 within the area of collection compartment 124 is provided with an inlet 136 and an inlet valve 138 which controls the introduction of compressed air via conduit 140 from a land-based compressor 142. The collection compartment 124 is also provided with a standpipe 142 controlled by a valve 144.

The overflow compartment 126 may also be supplied with air under pressure from the compressor 142 by means of an inlet 146 and associated valve 148. The overflow compartment 126 is also provided with an outlet at 150 which enables oil from the overflow tank 126 to be transferred to a land based storage tank 152 by means of a suitable conduit 154.

In the context of an oil spill close the shoreline, the intake 114 will ingest oil/water and feed it to the compartment 124 where the oil/water (with the oil film rising to the surface) rises to a level adjacent the aperture 130, at which time a switch will open the valve 128 to allow oil to flow into the overflow compartment 126. When the oil within the compartment 126 rises to a predetermined level, a switch will close the valve 128 as well as standpipe valve 144 while opening valve 148 to permit pressurized air to be introduced into the overflow compartment 126 forcing the oil therein through conduit 154 to the storage tank 152. When the level within the overflow tank 126 drops to another predetermined level below the aperture 130, a switch will shut down the compressor 142, close valve 148 and open standpipe valve 144 to resume the ingestion of oil/water into the collection compartment 124. It will be appreciated that the level of oil/water within the compartment 124 will be controlled by means of compressed air entering inlet 136 by means of control valve 138 in a manner described hereinabove with respect to the embodiment illustrated in FIG. 2. Similarly, the discharge 132 of water from the tank 124 may be controlled by valve 134 as also previously described. The use of the discharge valve 134 and discharge outlet 132 is particularly advantageous for purging the system.

Turning now to FIGS. 6 and 6A, another embodiment of the invention is illustrated which is also particularly useful for spills close to a beach or shoreline. In this embodiment, only the intake 156 is waterborne, with the remaining components of the system conveniently located on land. In this embodiment, the intake 156 which may be generally torus shaped, including a 360° omnidirectional inlet opening, also incorporates a pump 158 which is connected by means of hydraulic lines 160 to a land based power source 162. Pump 158 serves to transfer all ingested oil/water by means of conduit 164 to a collection and separation apparatus 166 which, in turn, separates the collected oil from the water and transfers the collected oil to a storage tank 168.

As illustrated in FIG. 6, the above described apparatus is intended to be used along with a conventional boom 170 which confines the spill to a specific area.

The collection/separation apparatus 166 is shown in more detail in FIG. 6A and includes a tank 172 formed with a bottom wall 74, a side wall 176 and a top wall 178. The tank bottom wall may include a discharge outlet 180 and associated valve 182 for discharging separated water from the apparatus. In addition, the tank 172 is provided with an interior cylindrical partition 184 which separates the tank into radially inner and outer chambers. This arrangement is similar in construction and operation to the embodiment illustrated in FIGS. 2-4, in that the interior partition 184 serves as a weir dam, allowing collected oil to spill over into the radially outer chamber 186. As in the previously described embodiment, the tank is provided with a standpipe 188 controlled by a valve 190 and a compressed air inlet or conduit 192 leading to a compressor 194. The inner portion of the tank is also in communication with a manometer tube 196 which indicates head pressure within the tank.

Oil spilling over the cylindrical weir dam 184 will be transferred from the radially outer chamber 186 to the storage tank 168 by means of conduit 198. It will be appreciated that the device illustrated in FIG. 6 operates substantially in the same manner as the apparatus illustrated in FIGS. 2-4, including the manner in which the oil/water level in the tank is controlled by pressurized air from the compressor 194.

It will be appreciated that the basic collection/separation apparatus of the present invention is useful not only in oceans and seaways, but also in lakes, harbors, marinas and adjacent waterside plants to collect and separate undesirable waterborne contaminants, with or without additional boom placement for further confinement of the spill. The apparatus also has application to the prevention of contamination of water treatment plants, desalinization plants, and various other industrial plants and, in this regard, the installation of the apparatus may be more or less permanent.

As indicated above, the apparatus as described in this application is useful not only for oil or other petroleum related spills, but also for collection and separation of mineral and vegetable oils, animal fats, or any contaminant with a specific gravity of less 1.0. In outside applications, the device may be utilized in settling ponds, drainage ditch arrangements, scale pits, sumps and the like while interior applications include open and closed tanks, waste treatment systems and the like.

In all of the above described embodiments, the main tanks may be constructed of 6061-T6 aluminum alloy, fiberglass or other suitable material. The catch basins may be formed similarly. The flexible conduits for use with the catch basins and main collection tanks may be constructed of neoprene, rubber or other suitable material. Valves, piping and other hardware and related controls are within the skill of the art.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Apparatus for collecting and separating two liquids having different densities, the apparatus comprising:
   a) a main tank including a bottom wall, a top wall, and a peripheral side wall, at least one liquid inlet opening for said two liquids and one liquid outlet means for the liquid of lesser density, said tank incorporating means for separating the two liquids;
   b) at least one free-floating intake device remote from said main tank, said intake device having at least one conduit extending from said intake device to said inlet of said main tank, to thereby permit the two liquids to enter the main tank to a variable level; and
   c) means for introducing a pressurized gas from a source of gas under pressure into said tank to control said variable level within said tank.

2. The apparatus of claim 1 wherein said at least one free floating intake device comprises a continuous torus having a 360° intake opening.

3. The apparatus of claim 1 wherein said at least one free floating intake device is connected to said main collection tank by means of one or more flexible conduits.

4. The apparatus of claim 1 wherein said main separation tank is a free floating structure, said at least one inlet is located in a side wall portion of said tank, and said tank, inlet and intake device are constructed and arranged such that the two liquids ingested into said free-floating intake device flow to said main separation tank under the influence of gravity.

5. The apparatus of claim 1 wherein said separating means includes a siphon pump connected to a siphon float means for siphoning the liquid of lesser density off the surface of the liquid of greater density within the tank.

6. The apparatus of claim 1 wherein said at least one liquid inlet is located adjacent said bottom wall.

7. The apparatus of claim 6 wherein said top wall includes a valve-controlled standpipe vented to atmosphere.

8. The apparatus of claim 7 wherein said top wall includes a gas inlet operatively connected to said source of gas under pressure.

9. The apparatus of claim 8 wherein said tank includes level sensing means for controlling activation of said source of gas under pressure and opening and closing of said standpipe.

10. The apparatus of claim 1 wherein said main collection tank is a free-floating structure.

11. The apparatus of claim 1 wherein said main tank is supported in a vessel below the water line of said vessel.

12. The apparatus of claim 11 wherein said main tank incorporates a substantially concentrically arranged weir dam separating said main tank into radially inner and outer chambers, and wherein said at least one liquid inlet feeds the two liquids to said inner chamber, and wherein means connected to said outer chamber are provided for carrying the liquid of lesser density to storage tanks onboard said vessel.

13. The apparatus of claim 1 wherein said tank is land-based.

14. The apparatus of claim 1 wherein said main collection tank is provided with a second liquid outlet means for discharging the liquid of greater density.

15. The apparatus of claim 1 wherein said means for introducing pressurized gas is located remote from said tank.

16. The apparatus of claim 15 wherein said tank includes collection and overflow compartments and a valve-controlled opening therebetween.

17. The apparatus of claim 16 wherein each of said compartments is operatively connected to said means for introducing pressurized gas.

18. The apparatus of claim 1 wherein said main tank is land-based, and said at least one free-floating intake device is provided with a pump for transferring collected liquids to said main tank.

19. Apparatus for clean-up of contaminant spills on waterways comprising:
   a main tank having a bottom wall, a peripheral side wall, and a top wall, said side wall including at least one contaminant/water inlet;
   a first pump located within said tank and a siphon float adapted to float on the surface of said contaminant/water within said tank and connected by a conduit to said first pump;
   a free floating intake device for ingesting contaminant/water from the surface of said waterway, said intake device connected to said at least one contaminant/water inlet by at least one conduit; and
   means for supplying compressed air from a source of compressed air to said tank for controlling the contaminant/water level in said main tank.

20. The apparatus of claim 19 wherein said means for supplying compressed air includes a conduit leading to at least one air inlet in said top wall.

21. The apparatus of claim 20 wherein said top wall is further provided with a standpipe for venting air in said main tank, and a valve for opening and closing the standpipe.

22. The apparatus of claim 21 including a first level sensor means in said main tank for activating said first pump when the level of contaminant/water rises to said first level sensor.

23. The apparatus of claim 22 including a second level sensor means above said first level sensor for activating said source of compressed air and for closing said standpipe valve when said level of contaminant/water reaches said second sensor.

24. The apparatus of claim 23 and including a third level sensor means located between said first and second sensors for shutting down the source of compressed air and opening said standpipe valve when said contaminant/water drops to said third sensor.

25. The apparatus of claim 19 wherein said main tank is a free-floating structure.

26. The apparatus of claim 19 wherein said main tank is supported in a vessel below the water line.

27. The apparatus of claim 26 wherein said main tank incorporates a substantially concentrically arranged weir dam separating said main tank into inner and outer chambers, and wherein said at least one inlet feeds said contaminant/water to said inner chamber, and wherein means connected to said outer chamber are provided for carrying the contaminant to storage.

28. The apparatus of claim 19 wherein said means includes a land-based compressor.

29. The apparatus of claim 19 wherein said main tank is provided with a normally closed discharge outlet for discharging water from the bottom of the tank.

30. The apparatus of claim 19 wherein said main tank is land-based and said at least one free-floating intake device is provided with a pump for transferring contaminant/water to said main collection tank.

31. In a system for collecting, separating and recovering a first liquid of lesser density floating on a second liquid of greater density which utilizes a substantially enclosed main tank for receiving ingested first and second liquids from a floating intake device and separating said liquids, the improvement comprising means for introducing pressurized gas from a source of gas under pressure into the tank to control the level of the first and second liquids in the tank.

32. A method of collecting liquids of different density and separating and recovering the liquid of lower density comprising the steps of:
   a) collecting the liquids of different density and introducing said liquids into a lower portion of a tank where the liquid of lower density rises to a surface level within the tank;
   b) separating the liquid of lower density from the surface level and transferring the liquid of lower density to storage; and
   c) controlling the level of liquids within the tank by introducing a compressed gas into an upper portion of the tank above the level.

33. The method of claim 32 wherein during step a), the upper portion of the tank is vented and flow of compressed gas into said upper portion is prevented until the liquids reach a first predetermined level within the tank.

34. The method of claim 33 wherein, when said liquids reach said first predetermined level, the upper portion of the tank is sealed and compressed gas is introduced into said upper portion, causing the level to drop toward a second predetermined level.

35. The method of claim 34 wherein, when said liquids reach said second predetermined level, said upper portion of said tank is vented and compressed flow of gas is halted.

36. The method of claim 32 wherein said gas comprises air.

37. The method of claim 32 wherein said liquids of different densities comprise oil and water.

38. The method of claim 32 wherein step c) is carried out by also discharging the liquid of greater density from the bottom of the tank in concert with the introduction of compressed gas.

39. The method of claim 32 wherein said tank is divided into a collection compartment and an overflow compartment and wherein said compressed gas is utilized to force the liquid of lesser density out of said overflow compartment.

40. The method of claim 32 wherein said tank includes a weir dam having an upper weir edge over which the liquid of lesser density flows to storage, and wherein said compressed gas is utilized to control the flow of liquid over said weir edge.

* * * * *